(12) United States Patent  
Stappaerts (10) Patent No.: US 6,879,279 B2  
(45) Date of Patent: Apr. 12, 2005

(54) DIFFERENTIAL OPTICAL SYNTHETIC APERTURE RADAR

(75) Inventor: Eddy A. Stappaerts, San Ramon, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/402,053

(22) Filed: Mar. 27, 2003

(65) Prior Publication Data

US 2004/0201514 A1 Oct. 14, 2004

Related U.S. Application Data

(63) Continuation-in-part of application No. 10/342,726, filed on Jan. 14, 2003, now abandoned.

(51) Int. Cl.$^7$ ............................................. G01S 13/90
(52) U.S. Cl. ................................. 342/25 R; 342/194
(58) Field of Search ......................... 342/25, 54, 103, 342/106, 107, 156, 194; 356/3.1, 5.04, 477, 479, 493, 495

(56) References Cited

U.S. PATENT DOCUMENTS

| | | | | |
|---|---|---|---|---|
| 3,790,939 A | * | 2/1974 | Constant | 342/25 |
| 4,321,601 A | * | 3/1982 | Richman | 342/25 |
| 4,360,271 A | * | 11/1982 | Downs et al. | 356/493 |
| 4,551,724 A | | 11/1985 | Goldstein et al. | |
| 4,687,281 A | | 8/1987 | Gross | |
| 5,995,223 A | * | 11/1999 | Power | 356/495 |
| 6,222,933 B1 | | 4/2001 | Mittermayer et al. | |
| 6,388,606 B1 | | 5/2002 | Keydel et al. | |
| 6,441,772 B1 | | 8/2002 | Hellsten et al. | |
| 6,559,932 B1 | * | 5/2003 | Halmos | 356/5.03 |
| 2003/0058159 A1 | * | 3/2003 | Bickert et al. | 342/174 |
| 2003/0122700 A1 | * | 7/2003 | Moreira et al. | 342/25 |

OTHER PUBLICATIONS

Frank Jay, "IEEE Standard Dictionary of Electrical and Electronic Terms", Jul. 20, 1984, p. 48.*
Lockwood et al., "Design of Sparse Array Imaging System", 1995 IEEE Ultrasonics Symposium, pp. 1237–1243.*
Le Clerc, F., et al., "Synthetic–aperture experiment in the visible with on–axis digital heterodyne holography," Optics Letters, vol. 26, No. 20, Oct. 15, 2001, pp. 1550–1552.

* cited by examiner

*Primary Examiner*—Thomas H. Tarcza
*Assistant Examiner*—Isam Alsomiri
(74) *Attorney, Agent, or Firm*—Michael C. Staggs; Eddie E. Scott; Alan H. Thompson

(57) ABSTRACT

A new differential technique for forming optical images using a synthetic aperture is introduced. This differential technique utilizes a single aperture to obtain unique (N) phases that can be processed to produce a synthetic aperture image at points along a trajectory. This is accomplished by dividing the aperture into two equal "subapertures", each having a width that is less than the actual aperture, along the direction of flight. As the platform flies along a given trajectory, a source illuminates objects and the two subapertures are configured to collect return signals. The techniques of the invention is designed to cancel common-mode errors, trajectory deviations from a straight line, and laser phase noise to provide the set of resultant (N) phases that can produce an image having a spatial resolution corresponding to a synthetic aperture.

18 Claims, 6 Drawing Sheets

DIFFERENTIAL OPTICAL SYNTHETIC APERTURE RADAR

RELATED APPLICATION

This application is a Continuation-In-Part of application Ser. No. 10/342,726 filed Jan. 14, 2003 now abandoned, and claims priority thereto.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to remote high-resolution imaging, and specifically to a system and method for forming high-resolution optical and RF images using a differential synthetic aperture radar technique.

2. State of Technology

Synthetic Aperture Radars (SARs) are used in military and non-military applications to provide high-resolution images using a predetermined frequency of electromagnetic radiation. Their spatial resolution is approximately given by the ratio of the wavelength and the effective antenna size. By forming a synthetic aperture, along the direction of flight, much larger than the physical size of the antenna, greatly improved resolution can be obtained along that direction. This is most commonly achieved by generating a profile of target return phase versus position along the synthetic aperture, at spacings equal to about half the physical antenna size (Nyquist rate) or less, while maintaining a linear trajectory.

A normal operating mode of SAR, called Stripmap mode SAR, includes imaging a strip having a length determined by the synthetic aperture as it is flown by a moving platform over a target area. The antenna pointing direction is kept fixed while image data are collected. The length of the strip is determined by a time window over which back-scattered radiation is collected using a series of pulses from an illuminated target area. The collected radiation is processed and an accumulation of data is used to construct a synthesized image of a target area. To form images, the platform is required to fly in a straight line or, if not, deviations from a straight line require corrections during processing.

Another mode of operation, i.e., Spotlight SAR, includes imaging a target by directing an antenna at the center of the imaging scene during the entire pass of the platform to provide a longer illumination time, (i.e., a spotlight aperture).

Accordingly, the present invention provides a Differential Synthetic Aperture Radar imaging technique that reduces system platform constraints to produce higher resolution images.

SUMMARY OF THE INVENTION

Accordingly, the present invention provides a differential synthetic aperture radar method to produce an image having a spatial resolution corresponding to a synthetic aperture of about Nd/4.

Another aspect of the present invention provides an imaging method from a moving platform that includes illuminating an object with electromagnetic radiation from an aperture of size d and collecting, from a plurality of platform positions separated by about d/4, a reflected radiation from the object by a first and a second sub-aperture, each sub-aperture having a predetermined width of about d/2. A plurality of differential phases from each of the plurality of platform positions is measured by optically splitting the collected radiation by the first sub-aperture into a first and a second optical beam that are directed to the first quadrature receiver and optically splitting the collected radiation by the second sub-aperture into a third and a fourth optical beam that are directed to the second quadrature receiver. A pair of common in-phase (I) local oscillator reference beams and a pair of common quadrature (Q) local oscillator reference beams are generated such that the (I) beams are directed to operationally heterodyne with the first and the third optical beams and the (Q) beams are directed to operationally heterodyne with the second and the fourth optical beams respectively. The heterodyne signals are processed to produce a first phase $\phi m_j$ and a second phase $\phi m_{j+1}$ with respect to the common local oscillator such that a phase differential $\phi m_{j+1} - \phi m_j$ between the sub-apertures is capable of being produced. A plurality of resultant (N) phases are calculated by summing the phase differentials at each of the platform positions according to $[\phi_{j+1} = \phi_j + (\phi m_{j+1} - \phi m_j)]$ to produce an image having a spatial resolution corresponding to a synthetic aperture of length of about Nd/4.

Accordingly, the present invention provides a differential synthetic radar method and apparatus that would relax stability requirements, compared to conventional SARs, such as: deviations from a straight line platform trajectory during the image formation time, both line-of-sight and out-of-plane, laser frequency stability (bandwidth), and speckle and turbulence distortion.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Referring now to the following detailed information, and to incorporated materials; a detailed description of the invention, including specific embodiments, is presented.

Unless otherwise indicated, numbers expressing quantities of ingredients, constituents, reaction conditions and so forth used in the specification and claims are to be understood as being modified by the term "about." Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

General Description

Conventional Radio Frequency (RF) Synthetic Aperture Radars (SARs) are well understood and extensively used for imaging of remote targets, but their extension to optical wavelengths is at an early stage of development. Issues include the required frequency stability of the laser and the precision within which the position of the phase sensor must be known during the time to acquire a complete synthetic image (i.e., a synthetic aperture size divided by platform velocity). To form images, the SAR platform must fly in a straight line or, if not, deviations from a straight line must be sensed or measured so that they can be corrected during processing. The deviation from a straight line must be a fraction of a wavelength of about $\lambda/10$. As an example, for an optical wavelength of 2 $\mu$m, this corresponds to 0.2 $\mu$m. At RF wavelengths, the tolerances are correspondingly larger. Even though the tolerances are small in the optical regime, the time over which they have to be maintained, (i.e., the length of the synthetic aperture), is also proportional to the wavelength and therefore much shorter, typically less than about 0.6 to about 6 milliseconds instead of seconds for average platform velocities of about 150 m/sec.

The present invention, Differential Synthetic Aperture Radar (DSAR) is analogous to "Stripmap mode" SAR (discussed herein before), but incorporates a differential technique that is capable of operating in the optical regime (e.g., from about 850 nm to about 10.0 microns) and the short-wavelength RF regime.

Specific Description

DSAR Geometry

Figures 1A, 1B:
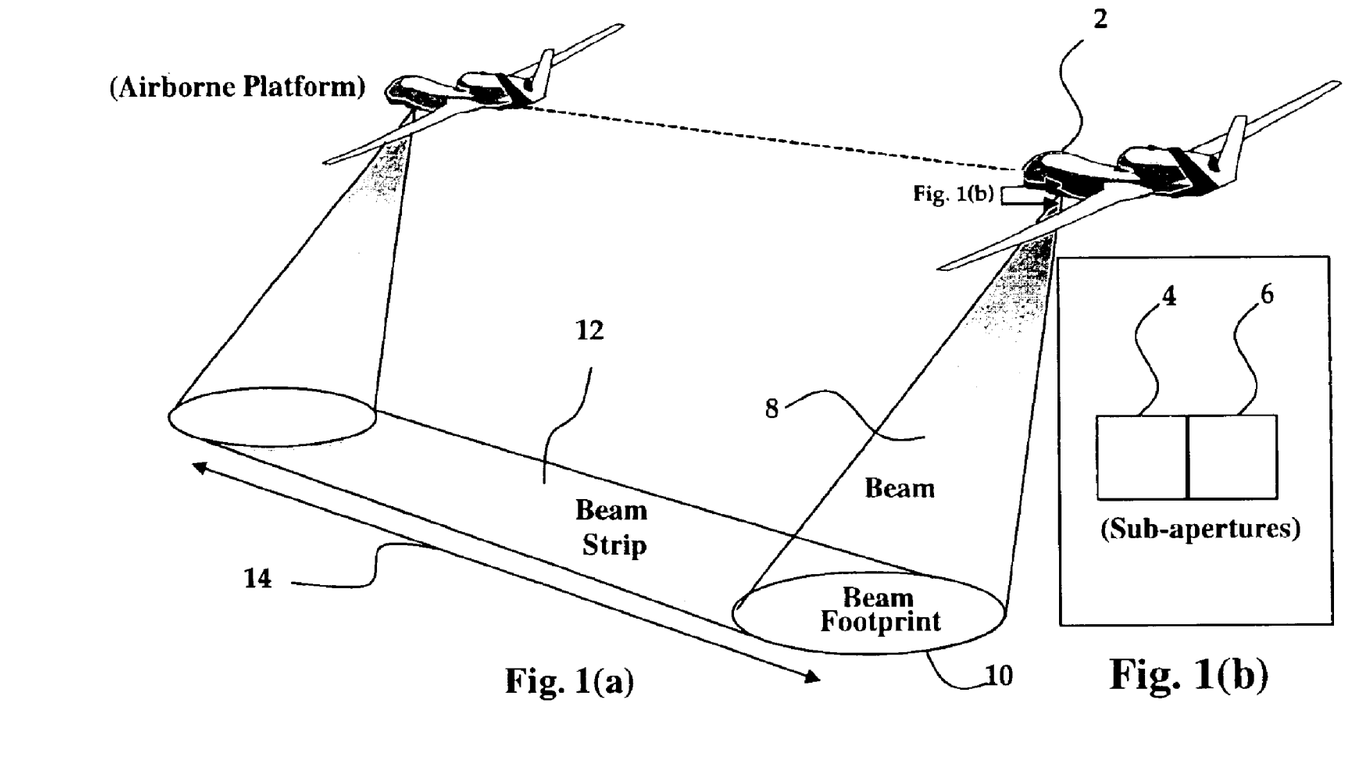
FIG. 1(a) illustrates a Differential SAR Stripmap mode geometry.
FIG. 1(b) illustrates a simplified schematic of the two sub-apertures incorporated as part of the present invention.

FIG. 1(a) and FIG. 1(b) illustrate the basic DSAR geometry. The real aperture (not shown) from a moving platform 2, such as an aerial vehicle, is divided into a first sub-aperture 4, and a second sub-aperture 6, as shown in FIG. 1(b). Each sub-aperture 4, 6, having a width from about 0.1 m to about 0.5 m, measures a phase for each laser illumination pulse (illustrated as an illumination source beam 8). A beam footprint 10 approximately equal to $\lambda$R/d, (with $\lambda$ as the illumination wavelength, R is the range to target, and d the combined physical size of the two sub-apertures) is created by beam 8 and carried along a strip 12 having a length 14. A phase profile along the synthetic aperture is then obtained by summing a predetermined number of phase differentials, and an image is subsequently extracted. The pointing direction of the illumination beam can be kept fixed, to a fraction of the diffraction-limit corresponding to the sub-aperture size, during an image formation time. Instruments such as gyroscopes can be used to keep the pointing of the illumination beam stable.

DSAR Concept

Figures 2A, 2B:
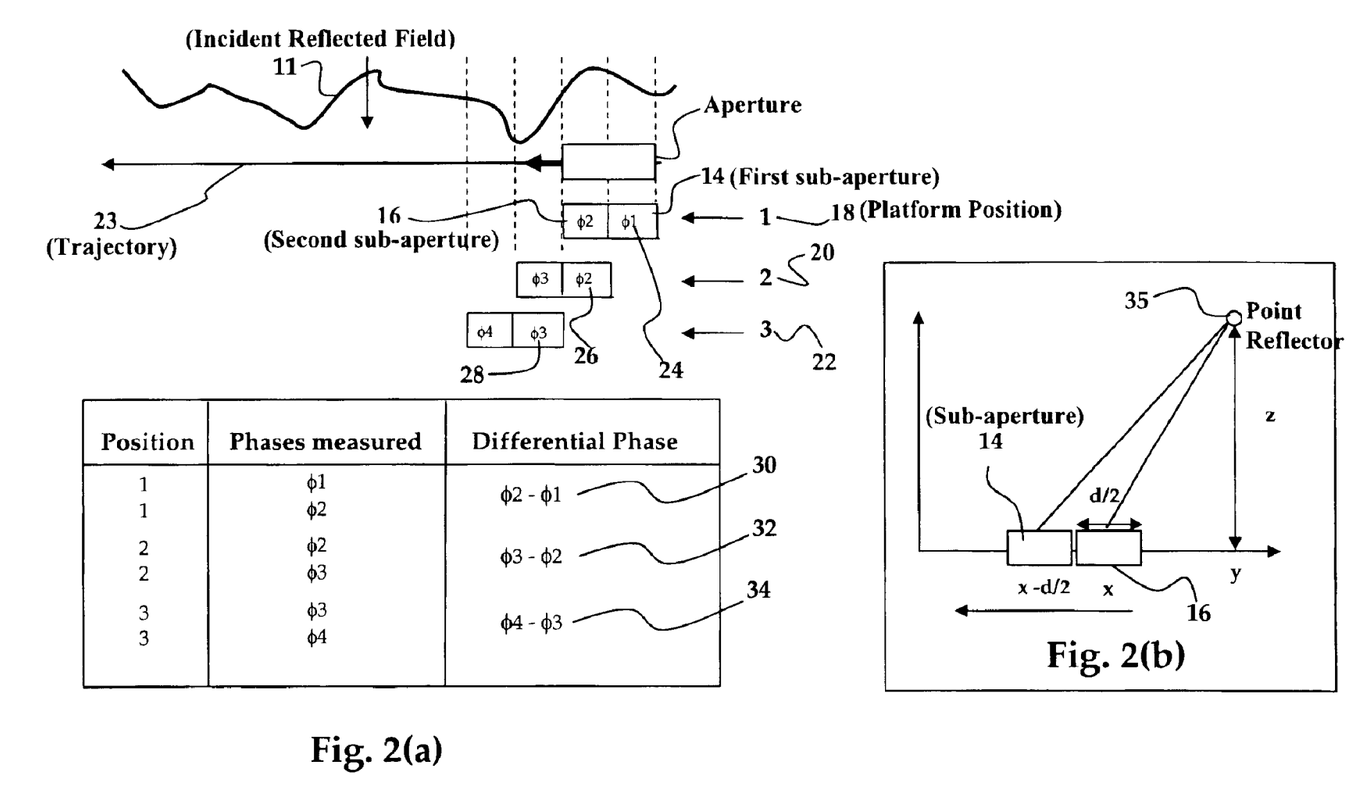
FIG. 2(a) illustrates the differential phase measurement technique disclosed in the present invention.
FIG. 2(b) further illustrates the differential phase measurement technique.

FIG. 2(a) illustrates the DSAR concept. Phase measurements of an incident reflected field 11 are made, for a first sub-aperture 14, and a second sub-aperture 16, at a number of platform positions 18, 20, 22 along a trajectory 23. The upper part of FIG. 2(a) shows "effective" platform translations, such as between platform positions 18 and 20, of d/2. The corresponding "physical" platform translations are d/4 because the path length from the transmitter to the target and the path length from the target to the receiver aperture both change. Since the collected reflected fields at the two sub-apertures 14, 16 result from the same transmitted pulse, and because a local oscillator (LO) (not shown), having a phase $\beta$, is common to both quadrature receivers (not shown), phase errors resulting from (small) deviations from a linear trajectory and from illumination and LO noise, cancel out when phases are calculated from a plurality of differential phases 30, 32, and 34, which are measured at each of platform positions 18, 20, and 22. Such differential phases 30, 32, and 34, are obtained by measuring the phases of the two sub-aperture fields and subtracting them, or from a correlation of the heterodyne output signals.

FIG. 2(b) further illustrates the DSAR concept. Thus, with sub-apertures 14 and 16, separated by d/2 as denoted, at positions (x−d/2) and (x) respectively, and a target point reflector 35 at position y, the differential phase can be computed from the following equation:

$$\Delta\varphi(x, y, z) \approx \frac{\pi}{\lambda z}\left[(y - x)d + \left(\frac{d}{2}\right)^2\right]$$

where $\lambda$=wavelength, d=aperture size, x=platform position, y=target position, and z=target range. For a translation of both sub-apertures by $\delta z$, $$\delta(\Delta\varphi) \approx \Delta\varphi \frac{\delta z}{z}$$

which is negligible for realistic platform motions since the maximum value of $\Delta\phi$ is about a radian and $\delta z/z \ll 1$. Similarly, out-of-plane translation produces a negligible change in differential phase. In addition, unlike conventional SAR, temporal coherence of the laser transmitter is required over only a single roundtrip time to the target area, not the transit time of the synthetic aperture time because of the differential method of the present invention, thereby relaxing laser frequency stability requirements.

The differential phases do not depend on target axial motion/Doppler. However, target motion can still be obtained from the Doppler shift measured using either of the sub-aperture receivers.

Source Bandwidth

A source of electromagnetic radiation for illuminating a target is typically a frequency-chirped laser or a short pulse laser. As an example, for a range resolution of 10 cm, a frequency chirp of about 4 GHz is required. Equivalently, a short pulse laser having a pulse-width less than about 250 picoseconds can be used. As stated herein before, if the source transmitter (i.e., a laser source) has phase-distortions/noise, they will appear in the return at both sub-apertures, and therefore cancel out when calculating the phase differentials. This cancellation relaxes the requirement on maximum phase noise, and therefore the laser source transmitter requirements. With atmospheric transmission properties and eye-safety concerns as design considerations, a source of electromagnetic radiation, such as one or more laser systems, provides illumination wavelengths, having a range between about 850 nm and about 10.0 µm, and more particularly at 2 µm, and 4 µm, and even more particularly at 1.5 µm. Exemplary laser source materials include carbon-diode gas, Yb or Er in the proper host material, and optical parametric oscillators. However, any type of amplifier means capable of operating within the parameters set forth herein can be employed in practice of the invention. Moreover, the application of using the differential technique of the present invention is additionally capable of operating at conventional SAR frequencies (i.e., RF frequencies) that are compatible with platform constraints, in particular, antenna size limitations.

Receiver

Figure 3A:
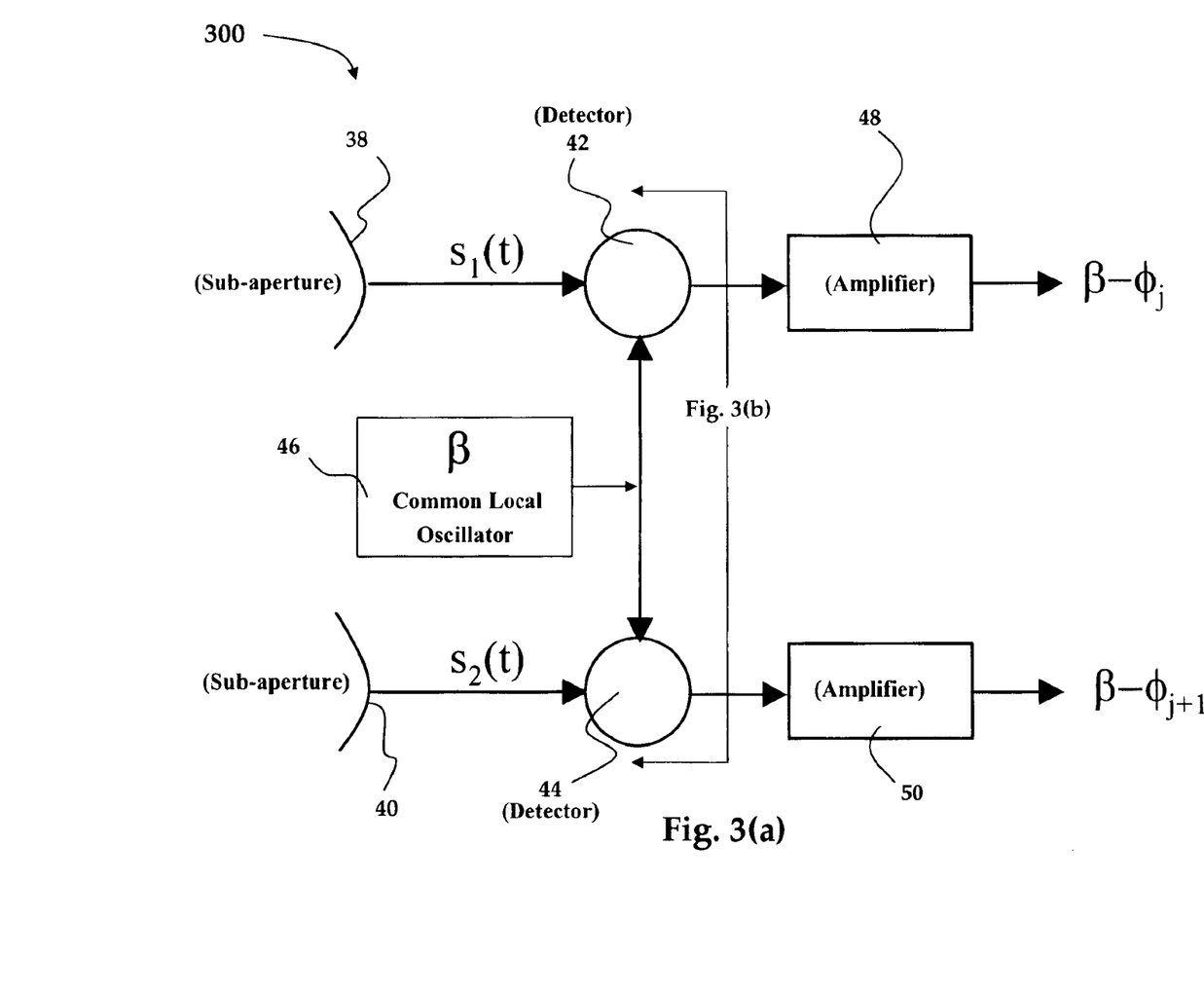
FIG. 3(a) shows a simplified schematic of a top down receiver.

FIG. 3(a) shows a basic schematic of a receiver system of the present invention, generally designated by the reference numeral 300, including a pair of sub-apertures 38, 40, capable of receiving return signals that vary with time (i.e., $s_1(t)$ and $s_2(t)$), a pair of high bandwidth heterodyne detectors 42, 44, a common local oscillator source 46 having a phase denoted as β, commercially available electronic amplifiers 48, 50 and commercially available A/D converters (not shown) as well as other conventional operationally connected processing electronics (not shown). Such architecture is similar to conventional SAR detection arrangements as described in a textbook by Fitch, J. P., *Synthetic Aperture Radar*, Springer-Verlag New York Inc., 1988. p. 11–18. TK 6592.S95F58.

Figure 3B:
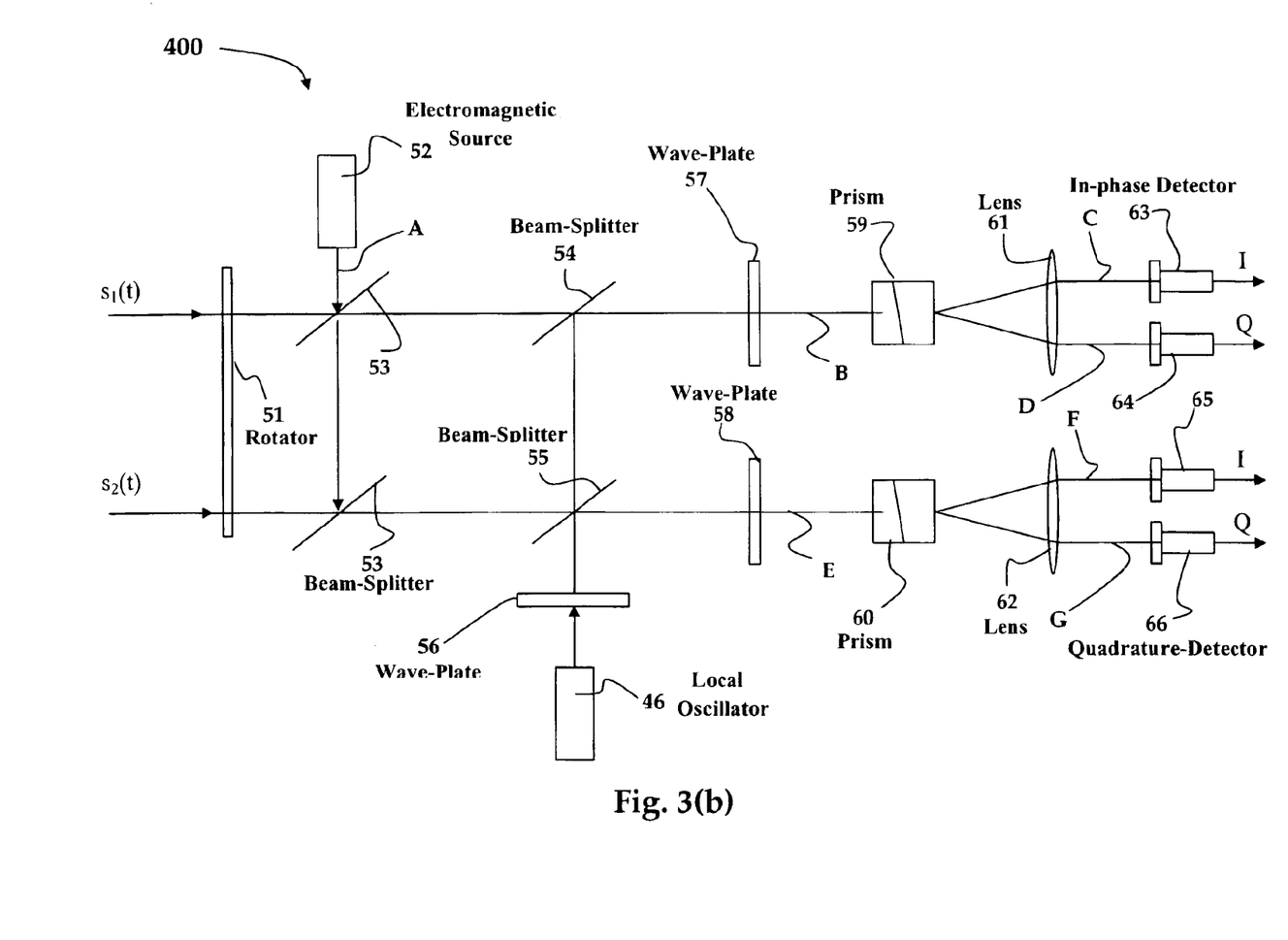
FIG. 3(b) shows a schematic of an exemplary DSAR optical receiver.

FIG. 3(b) shows an example of a DSAR optical receiver apparatus and is generally designated by reference numeral 400. In an exemplary method of the present invention, a linearly polarized illumination beam A from an electromagnetic source 52, is reflected by a polarizing beam-splitter 53 (shown as two polarizing beam splitters to illustrate the principles of the embodiment) and output through an aperture (not shown) that has a width of d. Sub-aperture receivers 38 and 40, as shown in FIG. 3(a), each having a width of d/2, collect a reflected radiation from a target (not shown) as shown as denoted return signals $s_1(t)$ and $s_2(t)$ respectively. A Faraday rotator 51, (i.e., a transparent material that rotates a plane of polarization of a polarized beam, with a direction of rotation dependent upon an applied dc magnetic field), causes a rotation of the plane of polarization of beam A from source 52, such as for example by 45 degrees, upon output of apparatus 400. Return signal $s_1(t)$ and $s_2(t)$ have their plane of polarization rotated an additional 45 degrees with respect to beam A upon transmission back though rotator 51. Such a technique enables a total of 90 degrees of rotation of the initial polarization state (i.e., of source 52) that enables return signals $s_1(t)$ and $s_2(t)$ to pass through beam-splitter 53 for detection and which also optically isolates $s_1(t)$ and $s_2(t)$ from source 52.

Local oscillator (LO) 46, having a linear output polarization, is transmitted through a quarter-wave plate 56, (i.e., an optical component that enables two polarization components of a polarized beam to be 90 degrees out-of-phase with respect to one another and thus be circularly polarized), and directed to a first beam-splitter 55 capable of transmitting between about 80 and about 90% of return signal $s_2(t)$ and capable of reflecting between about 10 and about 20% of an output of LO 46. A second beam-splitter 54, additionally capable of transmitting between about 80 and about 90% of return signal $s_1(t)$ and capable of reflecting between about 10 and about 20% of LO 46 that is transmitted through beam-splitter 55, reflects LO 46 and transmits $s_1(t)$. Both, $s_1(t)$ and LO 46 are substantially co-linear at the denoted point B after transmission through a first half-wave plate 57 designed for an operating wavelength of source 52. Half-wave plate 57 rotates incident linearly polarized return beam $s_1(t)$ by 45 degrees of rotation, while the beam of LO 46 remains circularly polarized. Both $s_1(t)$ and LO 46 are further directed to a first Wollaston prism 59 to produce orthogonally polarized and separated beams denoted as C and D. Beam C includes, for example, a vector component of $s_1(t)$ and an in-phase component of LO 46 while Beam D includes, for example, a vector component of $s_1(t)$ and a quadrature (i.e. a 90 degree out-of-phase component) component of LO 46. An optical component, such as lens 61, having a predetermined focal length then is arranged to direct beams C and D to a first in-phase 63 and a first quadrature 64 high-speed heterodyne detectors. Received beams C and D are then processed using conventional operationally connected electronics and heterodyne methods, to produce a phase ($\phi m_j$) of return signal $s_1(t)$ with respect to common LO 46.

Similarly, operationally coupled electronics and optical components are capable of receiving and processing return signal $s_2(t)$ such that a phase information ($\phi m_{j+1}$) may be extracted. Therefore, similar to the description for the optical path of return signal $s_1(t)$, between about 80 and about 90% of return signal $s_2(t)$ is transmitted through beam-splitter 55. Beam-splitter 55 also reflects and directs the output of LO 46 after passing through quarter-wave plate 56. LO 46 and $s_2(t)$ are substantially collinear at denoted point E after transmission through a second half-wave wave plate 58 also designed for an operating wavelength of source 52. Half-wave plate 58 rotates incident linearly-polarized return beam $s_2(t)$ by 45 degrees of rotation, while the beam of LO 46 remains circular. Both $s_2(t)$ and LO 46 are further directed to a second Wollaston prism 60 to produce orthogonally polarized and separated beams denoted as F and G. Beam F includes a vector component of $s_2(t)$ and an in-phase component of LO 46 while Beam G includes a vector component of $s_2(t)$ and a quadrature (i.e. a 90 degree out-of-phase component) component of LO 46. A second optical component, such as lens 62, having a predetermined focal length then is arranged to direct beams F and G to a second in-phase 65 and a second quadrature 66 high-speed heterodyne detectors. Similar to processed beams C and D, beams F and G are processed using conventional operationally connected electronics and methods, to produce phase ($\phi m_{j+1}$), of return signal $s_2(t,)$ with respect to common LO 46.

Phases $\phi m_j$ and $\phi m_{j+1}$ that are measured through the two sub-apertures for a given illumination pulse, can be written as the sum of the actual (correct) phase values and errors. The phase errors can further be divided into a common mode error $\epsilon_{cm}$ and non-common-mode errors, if any. Non-common-mode errors, if any, are not considered in the present invention and, therefore, $\phi m_j = \phi_j + \epsilon_{cm}$ and $\phi m_{j+1} = \phi_{j+1} + \epsilon_{cm}$, where $\phi_j$ and $\phi_{j+1}$ are the actual (correct) phase values. The common mode phase error, $\epsilon_{cm}$, cancels out when computing the actual phase values, and may be different for different illumination pulses. Accordingly, a measured phase differential $\phi m_{j+1} - \phi m_j$ between the sub-apertures is capable of being produced and a plurality of resultant (N) phases are calculated by summing the phase differentials at each of the platform positions according to $[\phi_{j+1} = \phi_j + (\phi m_{j+1} - \phi m_j)]$ to produce a image having a spatial resolution corresponding to a synthetic aperture of length of about Nd/4.

Phase Profiles and Phase Differentials

Figure 4A:
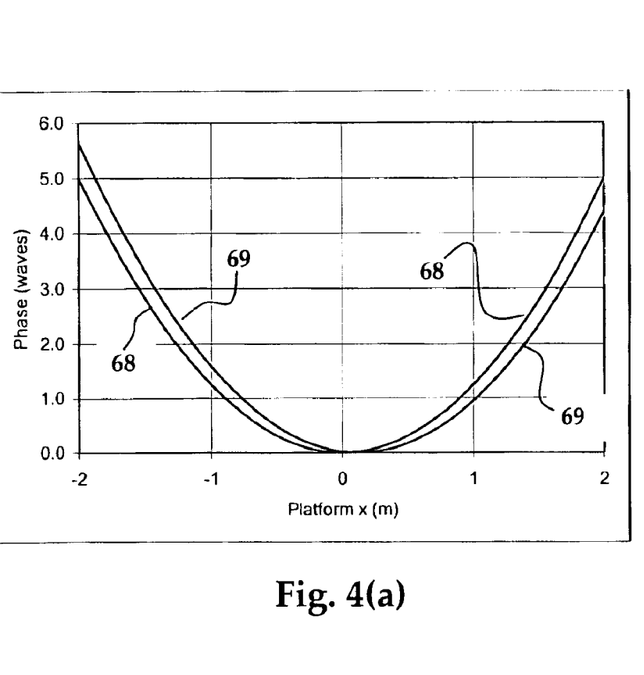
FIG. 4(a) illustrates theoretical phase profiles versus target position.
Figure 4B:
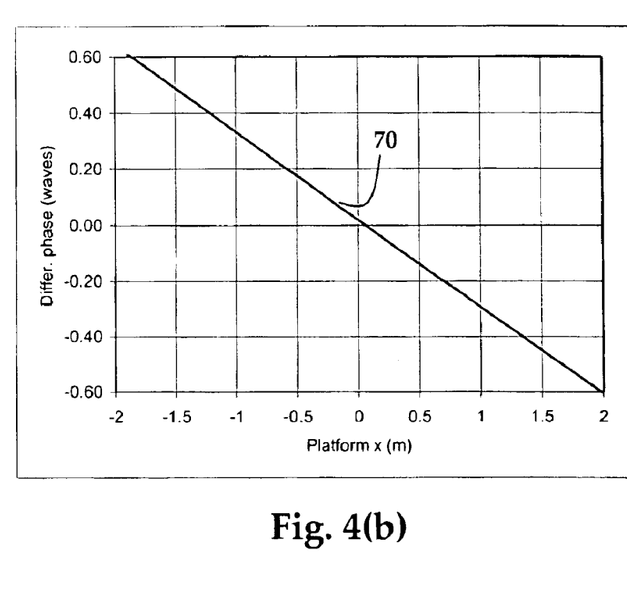
FIG. 4(b) shows a resultant theoretical plot of differential phase versus target position.

FIG. 4(a) shows exemplary theoretical sub-aperture phase profiles, 68 and 69, versus platform position from a DSAR apparatus, for a point-reflector target returning a phase front to a varying platform position, and with the following example input parameters: a wavelength λ=4 μm, an aperture d=0.25 m, denoted as numeral 13 as shown in FIG. 2, and a length L=100 km, denoted as numeral 14 as shown in FIG. 1(*a*). FIG. 4(*b*) illustrates a theoretical plot of differential phases 70 versus platform position after applying the method of the present invention to the theoretical (error-free) received phase profiles 68 and 69, as shown in FIG. 4(*a*).

Phase Error Buildup

Figure 5:
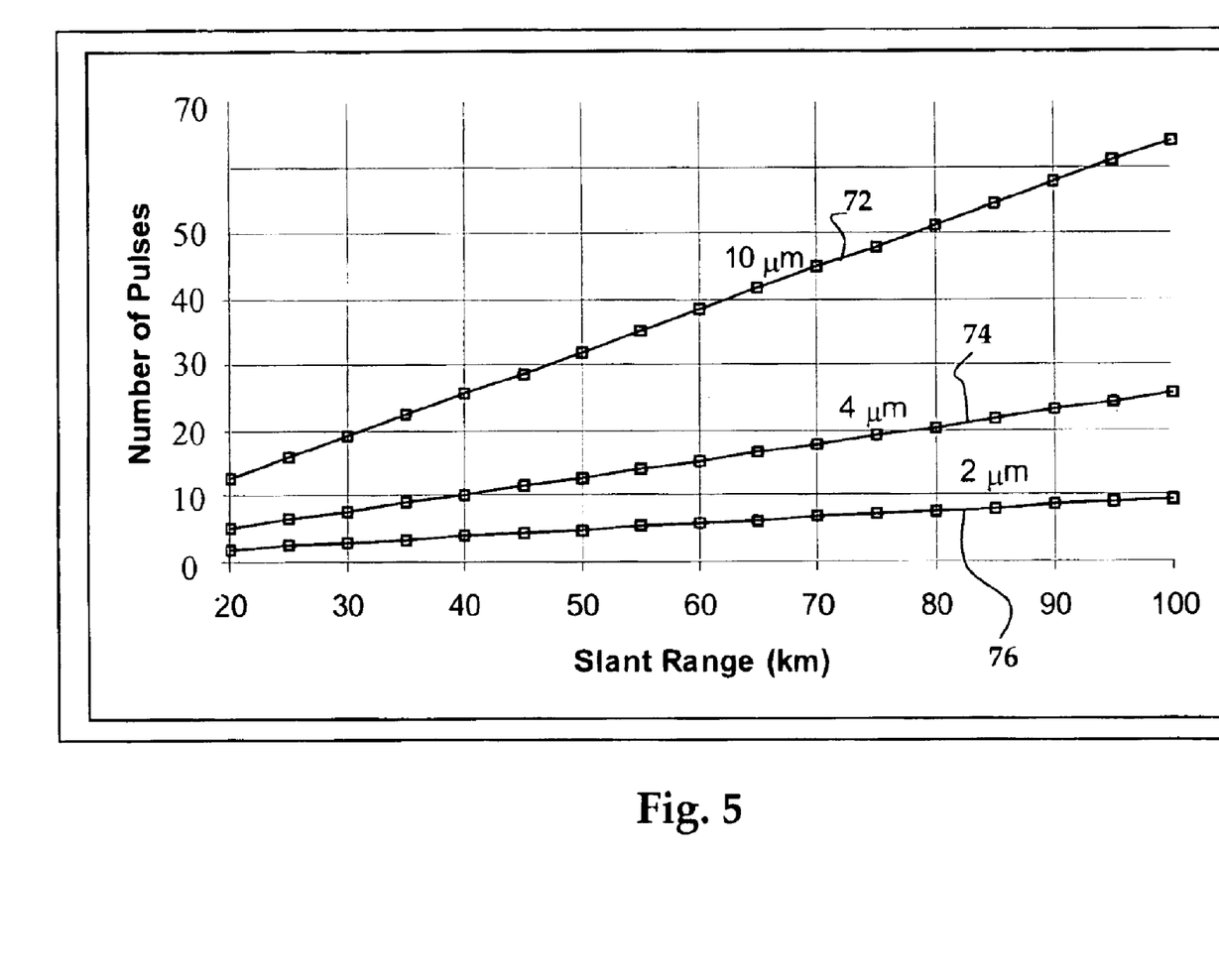
FIG. 5 shows a plot number of required pulses to form a synthetic image for three different wavelengths.

FIG. 5 shows a plot of the number of pulses needed to form a synthetic image versus range in kilometers for three wavelengths, 10 μm 72, 4 μm 74, and 2 μm 76, that are capable of being used as an illumination source for the present invention. As examples, from the given plot, for λ=10 μm, R=100 km, and d=0.25 m, $N_p$=64 pulses, while for λ=4 μm, R=50 km, and d=0.25 m, $N_p$=13 pulses.

As discussed herein before, a phase profile by the method of the present invention is obtained by summing phase differentials along the synthetic aperture. Since the phase profile is acquired by adding phase differentials, errors in the measured phases, in particular those resulting from intrinsic heterodyne detection shot noise, add in a random manner as a function of the number of pulses needed to form an image. This number ($N_p$) as shown in FIG. 5 on the vertical axis, is approximately $4\lambda R/d^2$, and is derived as follows: an effective length of the synthetic aperture is about λR/d, which is the size, at range R (i.e., antenna distance to the target), of a coherent beam having an illumination wavelength λ, transmitted from an aperture of size d, with a corresponding beam divergence of λ/d. Accordingly, if pulses are transmitted at positions separated by d/4, then the total number of pulses fired along the synthetic aperture is $N_p$=(λR/d)/(d/4)=$4\lambda R/d^2$, with d/2 being the physical size of each sub-aperture.

However, the linear (tilt) and quadratic (focus) optical aberration components of the random phase error do not significantly impact image quality, and, when they are removed or minimized, for example, by hardware or software techniques, the error buildup is small for typical numbers of pulses required. In addition, the precision of the individual phase measurements can be improved by increasing the illumination laser power and, thereby, the detection Signal to Noise Ratio (SNR).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An imaging method from a moving platform, comprising:

illuminating an object with an electromagnetic radiation source directed from an aperture, collecting a reflected radiation from the object by a first sub-aperture and a second sub-aperture, each having an effective width that is less than about the width of the aperture, for a plurality of platform positions, measuring a plurality of differential phases from the reflected radiation collected by the sub-apertures to produce a plurality of resultant (N) phases for each of the platform positions, wherein an image having a spatial resolution corresponding to a synthetic aperture is constructed from the resultant (N) phases, optically splitting the collected radiation by the first sub-aperture into a first and a second optical beam and optically splitting the collected radiation by the second sub-aperture into a third and a fourth optical beam, collecting the first and the second optical beams by an adapted first pair of high speed heterodyne detectors and collecting the third and the fourth optical beams by an adapted second pair of high speed heterodyne detectors, generating a pair of common in-phase (I) local oscillator reference beams and a pair of common quadrature (Q) local oscillator reference beams, mixing the first and the second collected optical beams with an I and a Q beam on a pair of adapted first high speed heterodyne detectors and mixing the third and the fourth collected optical beams with an I and a Q beam on a second pair of adapted high speed heterodyne detectors, processing the heterodyned signals to produce a first phase $\phi m_j$ and a second phase $\phi m_{j+1}$ with respect to the common local oscillator such that a measured phase differential $\phi m_{j+1} - \phi m_j$ between the sub-apertures is capable of being produced, calculating the resultant (N) phases by summing the phase differentials at each of the platform positions according to $[\phi_{j+1} = \phi_j + (\phi m_{j+1} - \phi m_j)]$; and processing the resultant (N) phases to produce an image having a spatial resolution corresponding to a synthetic aperture of about N(the effective width/4).

2. The method of claim 1, wherein the illumination source emits electromagnetic radiation having a wavelength range from about 850 nm to about 10 μm.

3. The method of claim 1, wherein the illumination source includes a laser.

4. The method of claim 1, wherein a platform motion deviation from a linear trajectory and along an illumination direction, and with a magnitude of up to about 0.1 percent of the target range, does not significantly degrade reconstructed image quality.

5. The method of claim 1, wherein a platform motion deviation from a linear trajectory and normal to the plane formed by the platform trajectory and an illumination beam, and with a magnitude of up to about 0.1 percent of the target range, does not significantly degrade reconstructed image quality.

6. The method of claim 1, wherein an obtained image is independent of an axial target motion.

7. The method of claim 1, wherein a spectral purity of an illumination source is determined by a single round-trip time equal to 2R/c, wherein R is the range to the target and c the speed of light.

8. The method of claim 1, wherein the sub-aperture is adapted to detect RF frequencies.

9. The method of claim 1, wherein the sub-aperture is adapted to detect optical frequencies.

10. An imaging method from a moving platform, comprising:

illuminating an object with an electromagnetic radiation source from an aperture of size d, collecting for a plurality of platform positions, a reflected radiation from the object by a first and a second sub-aperture, each sub-aperture having a predetermined width of about d/2, measuring a plurality of differential phases for each of the plurality of platform positions that includes, optically splitting the collected radiation by the first sub-aperture into a first and a second optical beam and optically splitting the collected radiation by the second sub-aperture into a third and a fourth optical beam, directing the first and the second optical beams onto a first quadrature receiver and directing the third and the fourth optical beams onto a second quadrature receiver, generating a pair of common in-phase (I) local oscillator reference beams and a pair of common quadrature (Q) local oscillator reference beams such that the (I) beams are directed to operationally heterodyne with the first and the third optical beams and the (Q) beams are directed to operationally heterodyne with the second and the fourth optical beams respectively, processing the heterodyne signals to produce a first measured phase $\phi m_j$ and a second measured phase $\phi m_{j+1}$ with respect to the common local oscillator such that a phase differential $\phi m_{j+1} - \phi m_j$ between the sub-apertures is capable of being produced, calculating a plurality of resultant (N) phases by summing the phase differentials at each of the platform positions according to $[\phi_{j+1} = \phi_j + (\phi m_{j+1} - \phi m_j)]$; and processing the resultant (N) phases to produce an image having a spatial resolution corresponding to a synthetic aperture of length of about Nd/4.

11. The method of claim 10, wherein the illumination source emits electromagnetic radiation having a wavelength range from about 850 nm to about 10 μm.

12. The method of claim 10, wherein the illumination source includes a laser.

13. The method of claim 10, wherein a platform motion deviation from a linear trajectory and along an illumination direction, and with a magnitude of up to about 0.1 percent of the target range, does not significantly degrade reconstructed image quality.

14. The method of claim 10, wherein a platform motion deviation from a linear trajectory and normal to the plane formed by the platform trajectory and an illumination beam, and with a magnitude of up to about 0.1 percent of the target range, does not significantly degrade reconstructed image quality.

15. The method of claim 10, wherein an obtained image is independent of an axial target motion.

16. The method of claim 10, wherein a spectral purity of the illumination source is determined by a single round-trip time equal to 2R/c, wherein R is the range to the target and c the speed of light.

17. The method of claim 10, wherein the sub-aperture is adapted to detect RF frequencies.

18. The method of claim 10, wherein the sub-aperture is adapted to detect optical frequencies.

* * * * *